United States Patent
Orr et al.

(10) Patent No.: US 6,840,883 B2
(45) Date of Patent: Jan. 11, 2005

(54) METHOD AND DESIGN OF AN AUTOMOTIVE DIFFERENTIAL

(75) Inventors: Brian Christian Orr, Macomb, MI (US); John E Rutt, Macomb Township, MI (US); Richard Michael Krzesicki, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/028,242

(22) Filed: Dec. 20, 2001

(65) Prior Publication Data

US 2003/0119621 A1 Jun. 26, 2003

(51) Int. Cl.[7] ............................................. F16H 48/06
(52) U.S. Cl. ........................................................ 475/230
(58) Field of Search ................................ 475/230, 248; 74/606 R, 607

(56) References Cited

U.S. PATENT DOCUMENTS

| | | | |
|---|---|---|---|
| 1,546,893 A | | 7/1925 | Haubert |
| 2,924,125 A | | 2/1960 | Brandon |
| 3,057,226 A | * | 10/1962 | Blomberg .................... 475/230 |
| 4,541,306 A | | 9/1985 | Hokusho et al. |
| 4,733,578 A | * | 3/1988 | Glaze et al. ............ 475/230 X |
| 4,793,211 A | | 12/1988 | Schmidt |
| 5,584,777 A | * | 12/1996 | Sander et al. ............... 475/230 |
| 6,066,064 A | * | 5/2000 | Nishiji ................... 475/230 X |
| 6,176,152 B1 | * | 1/2001 | Victoria et al. ......... 475/230 X |

FOREIGN PATENT DOCUMENTS

| | | | | |
|---|---|---|---|---|
| DE | 4341728 | * | 6/1994 | ................. 475/230 |
| JP | 357129949 | * | 8/1982 | ................. 475/230 |
| JP | 61-149652 | | 7/1986 | |
| JP | 404069438 | * | 3/1992 | ................. 475/230 |
| SU | 1676850 | | 9/1991 | |

* cited by examiner

Primary Examiner—Ha Ho
(74) Attorney, Agent, or Firm—Dickinson Wright PLLC

(57) ABSTRACT

A differential mechanism with offset, self-aligning spherical side gears and wider side gear separation to provide differential mechanism that is less expensive and easier to assemble. The differential mechanism includes a centerpoint of one surface or gear that is offset from a centerpoint of the chamber or casing along an axle centerline in a direction away from an opposing surface or gear.

9 Claims, 2 Drawing Sheets

METHOD AND DESIGN OF AN AUTOMOTIVE DIFFERENTIAL

The present invention relates generally to automotive differentials, and more particularly to a design for spherical side gears, which offer an improved assembly method.

DISCLOSURE INFORMATION

FIG. 1 shows a prior art differential mechanism having an outer housing 10 with a casing 12 rotatably supported therein on bearings 14. The casing 12 defines a chamber 16 and has a pair of diametrically opposed openings 18 therein. A pinion shaft 20, retained by a pin 22 in the casing 12 with one end thereof in each opening 18, transverses the chamber 16. A pair of pinion gears 24 are rotatably supported on the pinion shaft 20, one near each end, within the chamber 16. A pair of side gears 26 retained within the chamber 16 engage the pinion gears 24 to form a standard differential gear mechanism. The side gears 26 are axially aligned with the casing 12 and constrained by the differential gear mechanism to rotate in response to the pinion gears 24.

Each pinion gear 24 has a part-spherical end wall 24a and is supported thereat on a correspondingly shaped inner casing wall 12a. Similarly, each side gear 26 has a part-spherical end wall 26a where it is supported on a correspondingly shaped inner casing wall 12b. The inner casing walls 12a and 12b define a common sphere which has a radius R and whose center coincides with the intersecting point 21 where the axis of rotation of the pinion shaft 20 intersects the axis of rotation of the casing 12 or the axis of rotation of the side gears 26. It follows, therefore, that the pinion gear end walls 24a and the side gear end walls 26a define a common sphere having radius R. Side gear shoulders 80, are often incorporated to hold the side gears in place while axle shafts 82 are inserted into the side gears. Without these shoulders 80, the side gears 26 do not predictably remain aligned with the axle shafts 82 to facilitate easy assembly of axle shafts. In order to maintain side gear alignment, shoulders 80 are added to the side gears 26 in order to speed and ease assembly operations for differential mechanisms.

As illustrated in FIG. 2, U.S. Pat. No. 4,541,306 describes a differential mechanism in which the side gear end walls describe two different spheres, each of whose center is offset some difference from the differential center 21. The invention describes offsets of each spheres centerpoint 30, toward the other spheres walls 28a, resulting in a more narrow differential mechanism. No side gear shoulders are required since the offset spheres which define the inner walls will serve to hold the side gears 26 in the correct position to allow insertion of axle shafts. This narrower differential however, has less space within the chamber 16, than typical differential mechanisms. This smaller space means that assembly operations are more time consuming since it is more difficult to assemble the pinion gears 24, pinion shaft 20 and side gears 26 in this smaller than normal space. U.S. Pat. No. 4,541,306 teaches away from the present invention by claiming and describing spherical offsets toward opposing spherical surfaces, resulting in a narrower differential.

The prior art differential mechanisms are difficult and costly to assemble.

It would be desirable, therefore, to provide a differential mechanism which does not require shoulders but is wide enough to facilitate easy assembly of the differential mechanism components.

SUMMARY OF THE INVENTION

Referring to FIG. 3, the present invention overcomes the disadvantages of the prior art approaches by providing a differential casing with a chamber 16, having an axle centerline 18 and defined by at least one spherical surface 26a and at least one opposing surface 27a, wherein the centerpoint of the spherical surface 50 is substantially collinear with the axle centerline 18 and is offset from the centerpoint 54 of the chamber 16 some distance along the axle centerline 18 in a direction away from the opposing surface 27a.

The offset distance between the centerpoint 50 of the spherical surface 26a and the centerpoint 54 of the chamber 16 can be effective even if very small in relation to the spherical radius of the side gear 26.

The present invention further overcomes the disadvantages of the prior art by providing an automotive differential mechanism comprising a pinion shaft; a first pinion gear; a second pinion gear; a first side gear, having a first side gear outer radius; a second side gear having a second side gear outer radius; and, a differential casing having a first axle shaft port, a second axle shaft port, a first inner radius, a first radius center point, a second inner radius and a second radius center point, wherein the second radius center point is offset a distance from the first radius center point such that when the first and second pinion gears, the pinion shaft and the first and second side gears are installed within the differential casing, the pinion gears and the pinion shaft force the first side gear outer radius into the first inner radius and the second side gear outer radius into the second inner radius such that the first side gear is substantially aligned with the first axle shaft port and the second side gear is substantially aligned with the second axle shaft port.

The present invention further overcomes the prior art by providing a differential mechanism comprising a casing adapted to be rotatably driven about an axis of rotation and having a chamber defined by walls; a pair of pinion gears retained within the chamber rotatable about an axis of rotation normal to and having an intersection point with the axis of rotation of the casing; a pair of side gears having a part-spherical endwall; a means for retaining the side gears from rotating within the chamber about the axis of rotation of the pinion gears including a pair of part-spherical regions defined in the chamber, each region being defined by a wall of the chamber having a spherical shape substantially complementary to the end wall of one of the side gears and each region providing a recess in the chamber for supporting one of the side gears; each of said side gear receiving part-spherical regions comprising part of a sphere having a center located on the axis of rotation of the casing and offset from the intersecting point in a direction providing a chamber extending more in the axial direction of the casing than in the direction of the axis of rotation of the pinion gears.

These and other advantages, features and objects of the invention will become apparent from the drawings, detailed description and claims which follow.

DESCRIPTION OF THE PREFERRED EMBODIMENT(S)

Figure 1:
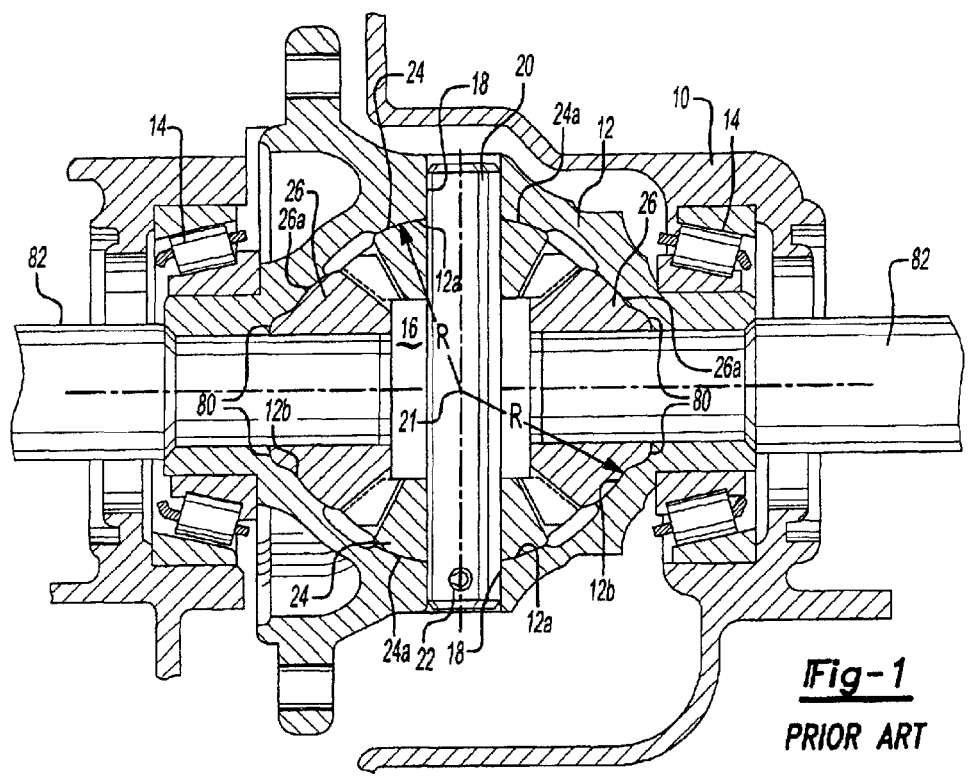
FIG. 1 is a drawing of a prior art differential mechanism which uses shoulders to position the side gears
Figure 2:
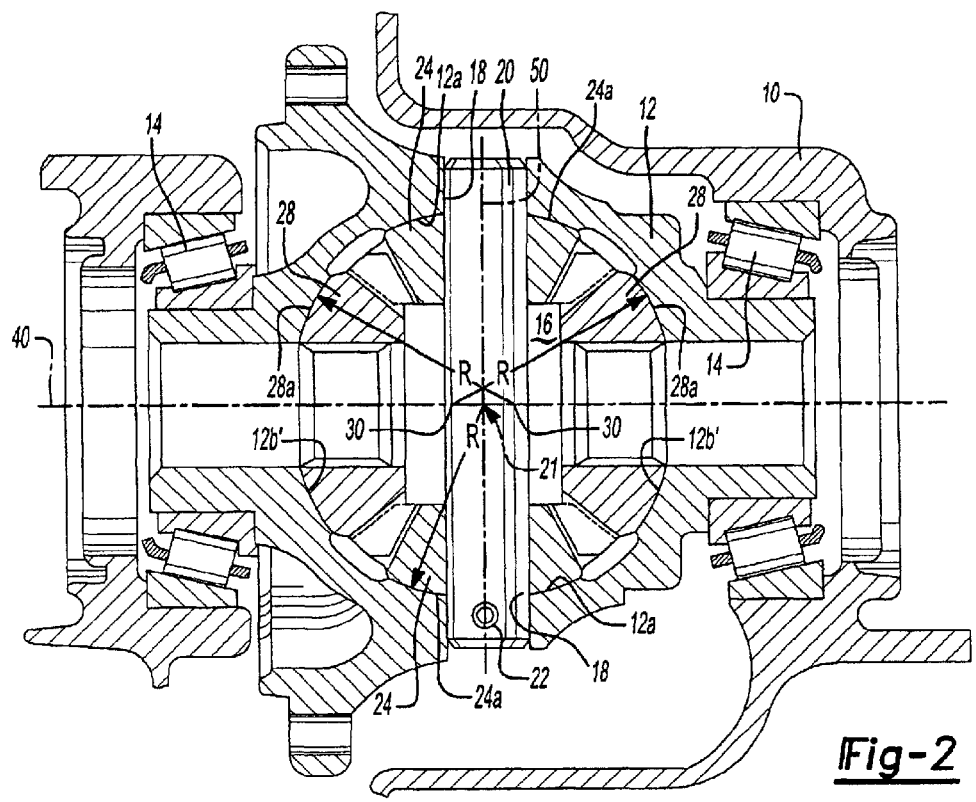
FIG. 2 is a drawing of a prior art differential with offset spherical centers towards respective opposing surfaces.
Figure 3:
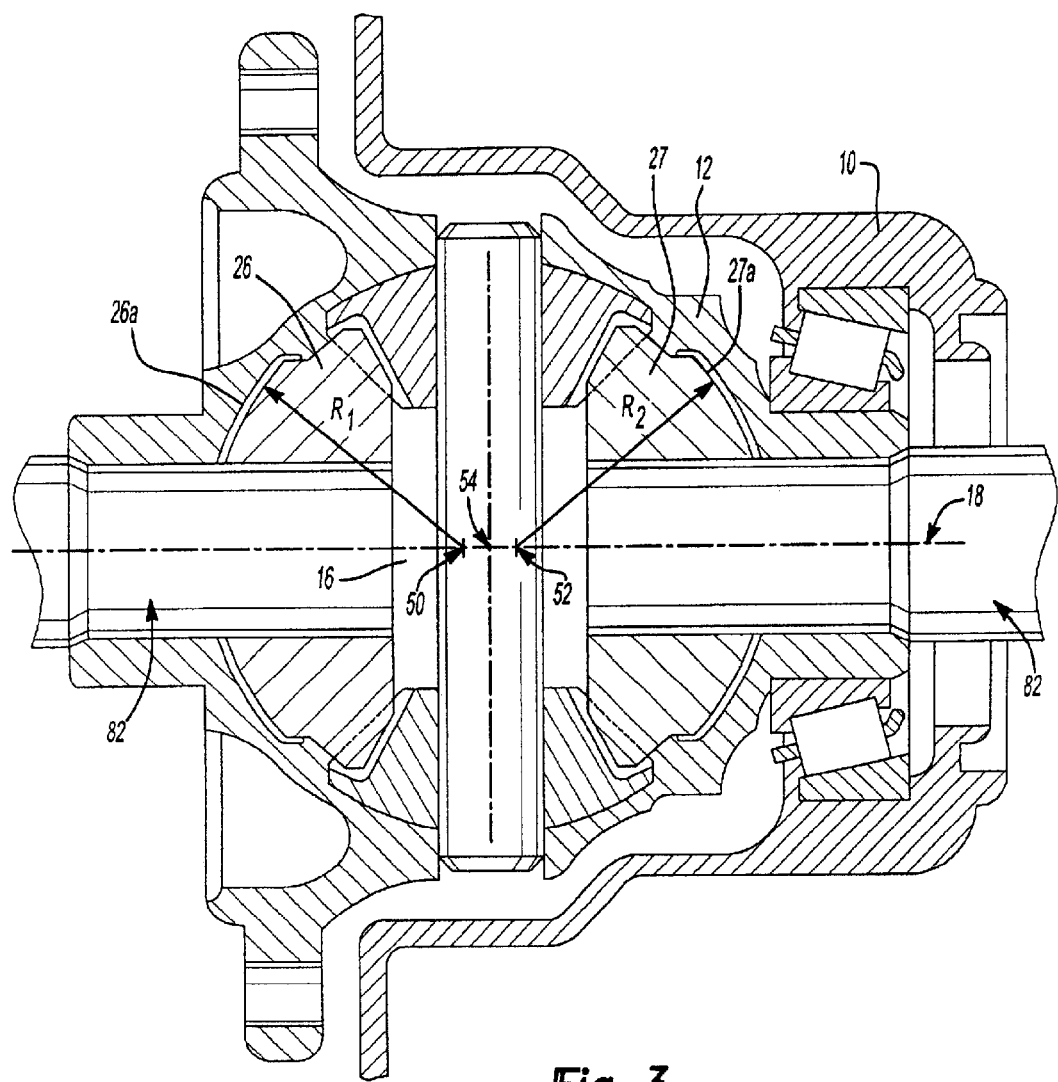
FIG. 3 is a drawing of the present invention illustrating spherical centers offset away from respective opposing surfaces and providing a wider differential chamber.

FIG. 3 provides is a side view of an automotive differential mechanism comprising a first side gear 26, a second side gear 27; and a differential chamber 16 formed by offsetting the spherical centerpoint 50 of the surface of the first side gear 26a away from the surface of the second side gear 27a along the common axis of the side gears 26 and 27. Offsetting the spherical surface of even a single side gear is sufficient to maintain some degree of alignment between the first and second side gears 26 and 27 and the axle shafts 82 during assembly.

In FIG. 3, the spherical centerpoint 52 of the second side gear 27 also is offset along the common axis of the two side gears 26 and 27 away from the surface of the first side gear 26. By offsetting both side gear surfaces in this way, the side gears are capable of maintaining alignment to a very high degree with the axle shafts 82 during assembly operations. In addition, by offsetting both side gears in this manner, a wider differential cavity 16 is formed thus allowing for easier component assembly.

Offsetting these two gears in this way eliminates a need for aligning shoulders which were used in the prior art. By offsetting the centerpoints away from each other, a wider, easier to assemble differential mechanism results.

Various other modifications to the present invention may occur to those skilled in the art to which the present invention pertains. For example, the addition of thrust washers to each side gear. Other modifications not explicitly mentioned herein are also possible and within the scope of the present invention. It is the following claims, including all equivalents, which define the scope of the present invention.

What is claimed is:

1. A differential casing comprising:
   a chamber having an axle centerline, a centerpoint, and defined by at least one spherical surface and at least one opposing surface, wherein a centerpoint of said at least one spherical surface is substantially collinear with said axle centerline and is offset from the centerpoint of said chamber by an offset distance along said axle centerline in a direction toward said at least one spherical surface such that said at least one spherical surface is closer to said centerpoint of said at least one spherical surface than said chamber centerpoint.

2. A differential casing as in claim 1 wherein the ratio of the radius of said at least one spherical surface to said offset distance is at 30.

3. An automotive differential mechanism comprising:
   (a) a first side gear having a spherical centerpoint;
   (b) a second side gear having a surface; and
   (c) a differential chamber having an axle centerline and a chamber centerpoint, wherein the spherical centerpoint of said first side gear is offset from the chamber centerpoint in a direction substantially along said axle centerline away from the surface of said second side gear.

4. An automotive differential mechanism comprising:
   (a) a pinion shaft;
   (b) a first pinion gear;
   (c) a second pinion gear;
   (d) a first side gear, having a first side gear outer surface;
   (e) a second side gear having a second side gear outer surface; and,
   (f) a differential casing having an axle centerline, a casing centerpoint, a first axle shaft port, a second axle shaft port, a first inner surface defining a first inner radius having a first radius center point, and a second inner surface defining a second inner radius having a second radius center point, wherein said second radius center point is substantially collinear with said axle centerline and offset from said casing centerpoint an offset distance along said axle centerline in a direction away from said first inner surface such that when said first and second pinion gears, said pinion shaft and said first and second side gears are installed within said differential casing, said pinion gears and said pinion shaft force said first side gear outer surface towards said first inner surface and said second side gear outer surface towards said second inner surface such that said first side gear is substantially aligned with said first axle shaft port and said second side gear is substantially aligned with said second axle shaft port.

5. An automotive differential mechanism according to claim 4 wherein said first and second side gears do not have alignment shoulders.

6. A differential mechanism comprising:
   (a) a casing adapted to be rotatably driven about an axis of rotation and having a chamber defined by walls;
   (b) a pair of pinion gears retained within said chamber rotatable about an axis of rotation normal to and having an intersection point with said axis of rotation of said casing;
   (c) a pair of side gears having a part-spherical endwall;
   (d) means for retaining said side gears from rotating within said chamber about the axis of rotation of said pinion gears including a pair of part-spherical regions defined in said chamber, each said region being defined by a wall of said chamber having a spherical shape substantially complementary to the end wall of one of said side gears and each said region providing a recess in said chamber for supporting one of said side gears;
   (e) each of said part-spherical regions comprising part of a sphere having a center located on said axis of rotation of said casing and offset from said intersecting point in a direction opposite the offset direction of the other of said part-spherical regions providing the chamber extending more in the axial direction of said casing than in the direction of the axis of rotation of said pinion gears.

7. The differential casing of claim 1 wherein said at least one opposing surface is spherical and has a centerpoint, and wherein said centerpoint of said at least one opposing surface is offset from the chamber centerpoint by an offset distance along said axle centerline in a direction away from the centerpoint of said at least one spherical surface.

8. The automotive differential mechanism of claim 3 wherein said surface of said second side gear has a centerpoint offset from said chamber centerpoint in a direction away from the spherical centerpoint of the first side gear.

9. The automotive differential mechanism of claim 4 wherein the said first radius centerpoint is substantially collinear with said axle centerline and offset from said casing centerpoint an offset distance along said axle centerline and in a direction away from said second inner surface.

* * * * *